Dec. 31, 1968     N. RUDD     3,419,332
APPARATUS FOR GEOLOGICAL CORE-LOGGING AND THE LIKE
Filed Oct. 6, 1966

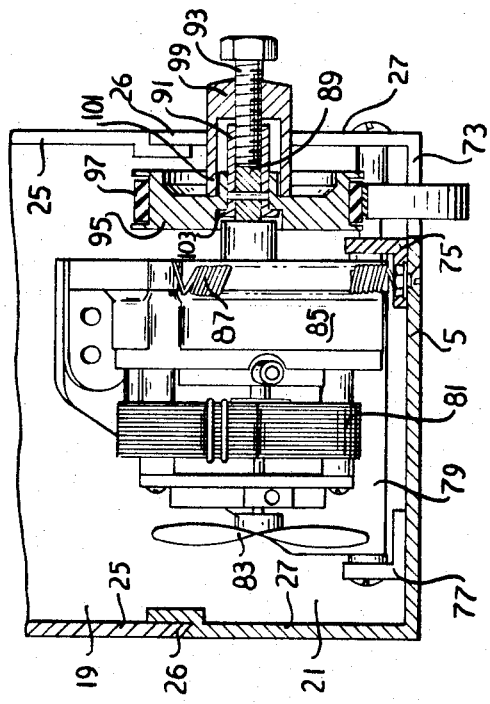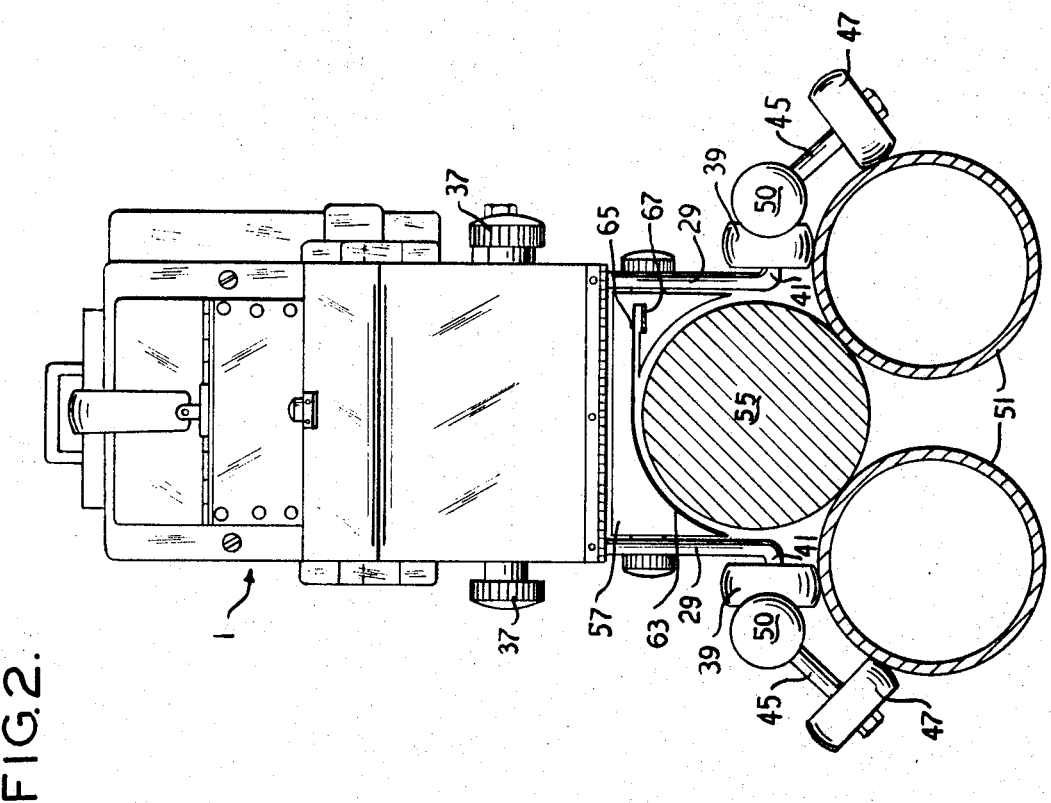

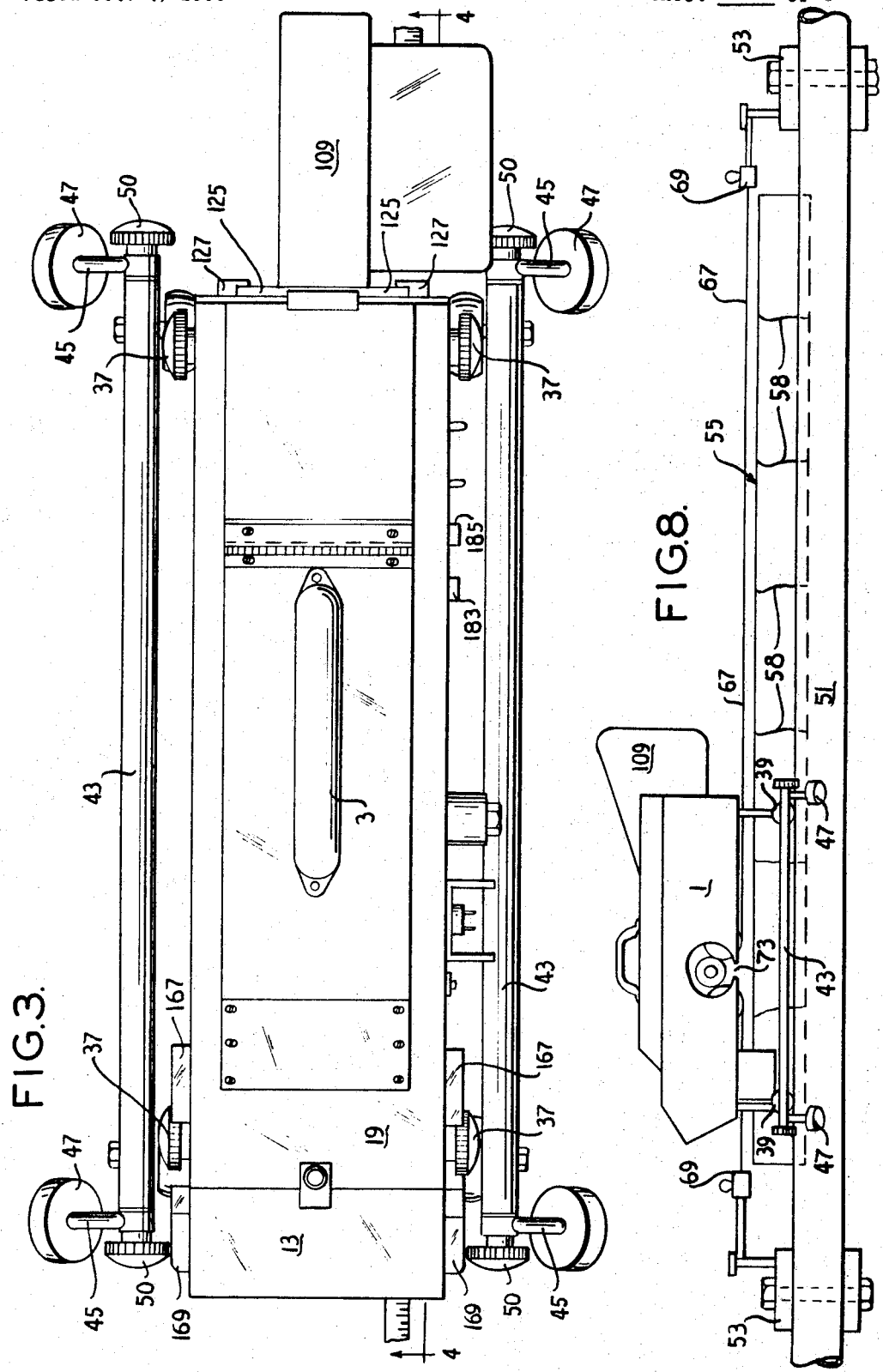

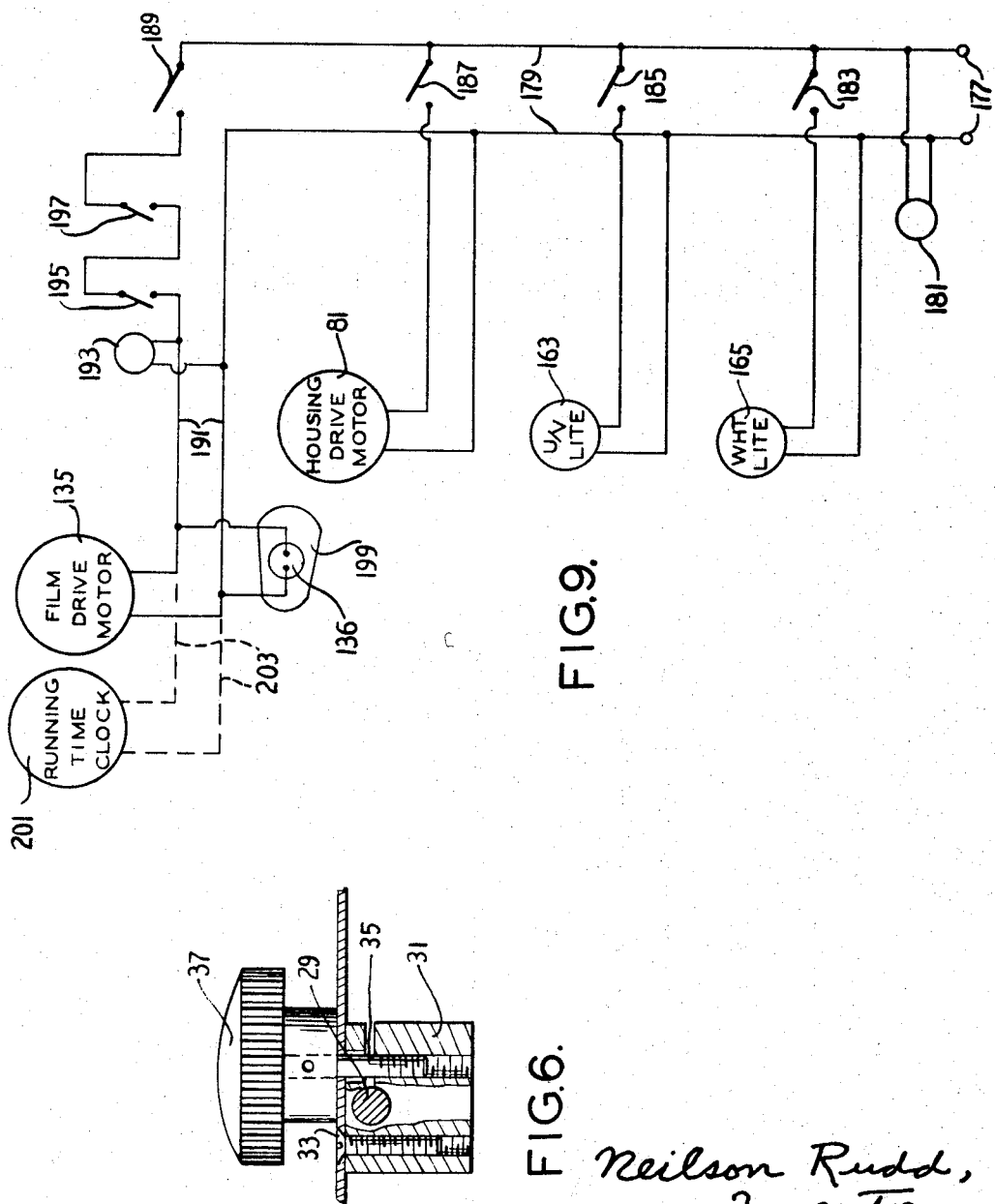

United States Patent Office
3,419,332
Patented Dec. 31, 1968

3,419,332
APPARATUS FOR GEOLOGICAL CORE-LOGGING AND THE LIKE
Neilson Rudd, Mount Vernon, Ill., assignor to Geo-Engineering Development Co., Mount Vernon, Ill., a corporation of Delaware
Filed Oct. 6, 1966, Ser. No. 584,784
14 Claims. (Cl. 356—162)

This invention relates to apparatus for geological core-logging and the like, and with regard to certain more specific features, to a camera for producing continuously exposed black-and-white or color pictures of elongate objects such as geological cores, rails, pipes and the like.

Among the several objects of the invention may be noted the provision of conveniently operable apparatus for photographing elongate objects in general and in particular to either a solid or a reconstructed fractured length of core material when removed from the earth, to obtain a continuous picture thereof; the provision of apparatus of the class described by means of which photographs may be obtained of cores or the like under different lights to provide for various analyses; the provision of apparatus of the class described which may be employed conveniently at a working site on an accountable rental or lease basis; and the provision of apparatus of this class which provides in a continuous picture a scale for presenting measurements on the pictures of the elongate objects relating to areas of interest thereon. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

In the accompanying drawings, in which one of various possible embodiments of the invention is illustrated, FIG. 1 is a side elevation of apparatus made according to the invention;

FIG. 2 is a left end elevation of FIG. 1, partly in section;

FIG. 3 is a top plan view of the camera;

FIG. 5 is a detail section approximately on line 5—5 of FIG. 1;

FIG. 6 is an enlarged detail section approximately on line 6—6 of FIG. 4;

FIG. 7 is a detail section approximately on line 7—7 of FIG. 1;

FIG. 8 is a diagrammatic side elevation of the apparatus as a whole, shown on a reduced scale;

FIG. 9 is a wiring diagram; and

Corresponding reference characters indicate corresponding parts throughout the several views of the drawings.

While the invention has general applications, it will be described as an example in connection with core-logging operations. It is common practice by use of core drills to remove geological cores from the earth to determine earth structure, composition and the like at sites proposed for drilling oil wells, driving piles and the like, to acquire knowledge of structural stratigraphic conditions. From cores so removed, various types of information may be determined such as stratification, porosity, permeability, fluid-saturation, type of fluid, et cetera, useful for analysis by those skilled in the art. By means of the present invention the core material is conveniently photographed either in black and white or color for subsequent examination and analysis. In addition, it provides at working sites means for keeping accurate account of information required to compute the costs of the photography.

Figure 1:
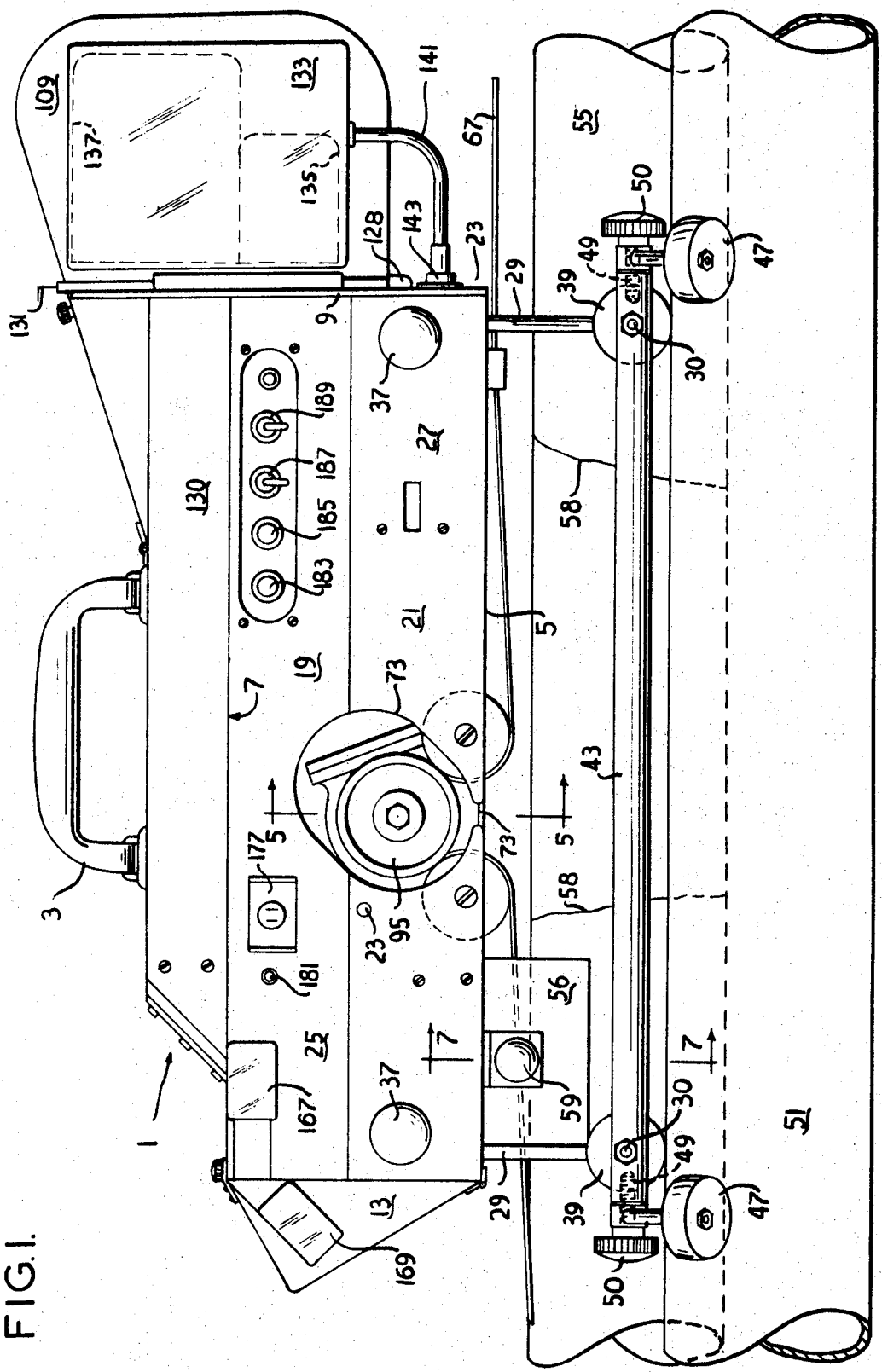
Figure 4:
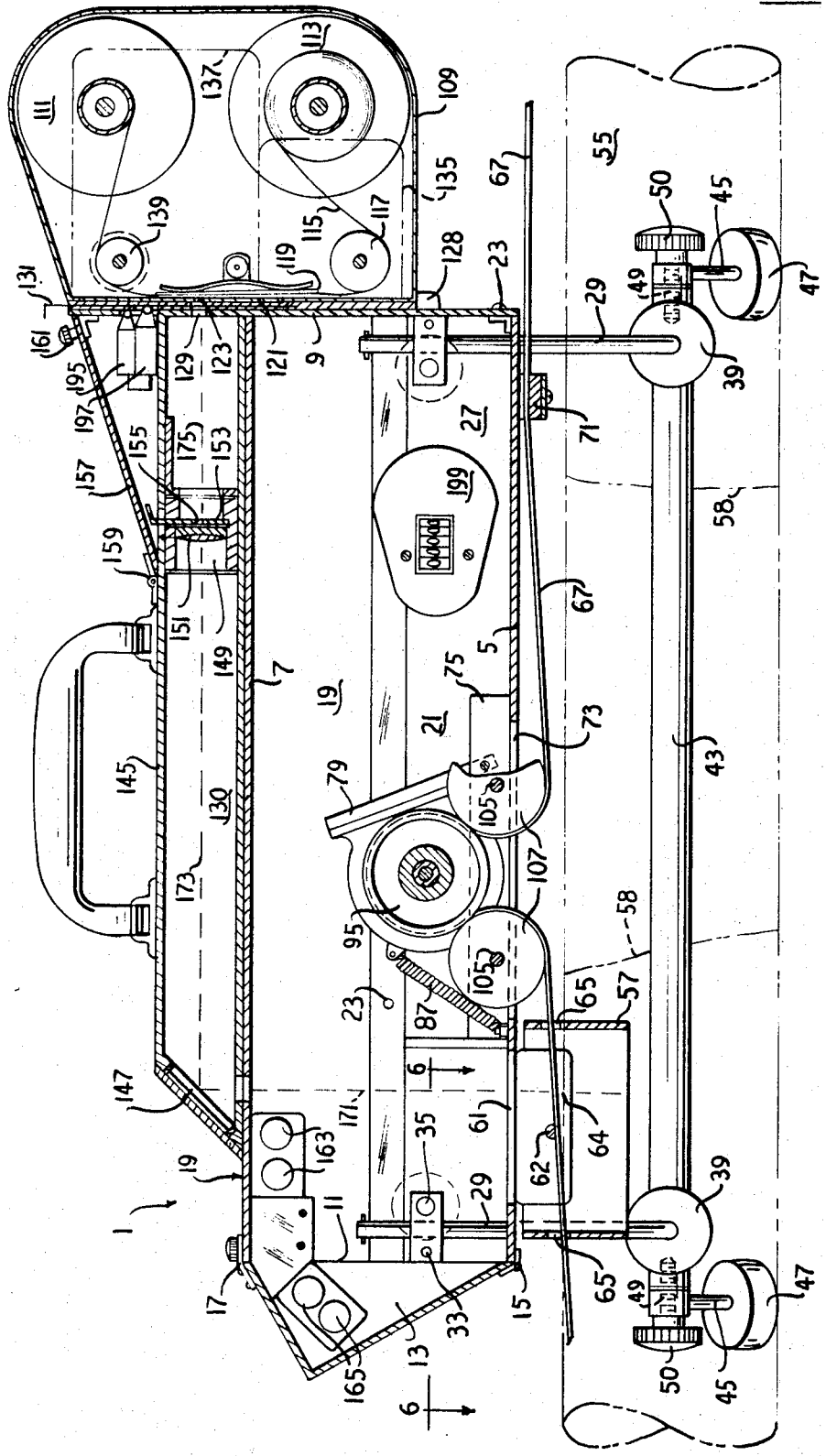
FIG. 4 is a longitudinal vertical section on line 4—4 of FIG. 3, the dot-dash lines outlining core material.

Referring now to the drawings (FIGS. 1–4) there is shown in general at numeral 1 a housing having a handle 3 for carrying purposes. This housing taken as a whole has a bottom wall 5, a top wall 7, a rear wall 9 and a front opening 11 covered by a front door 13, hinged at 15 and adapted to be latched shut by a latch 17. The housing is composed of an upper section 19 and a lower section 21. These are separable. The top section 19 has side walls 25 having lapped connections at 26 with side walls 27 of the bottom section 21 (FIG. 5). The top section also carries a rear wall 9 which extends down to enclose the rear (right-hand end) of the bottom section 21 (FIGS. 1 and 4). Screws 23 in the lapped connections 26 between the side walls 25 and 27 and between the rear wall 9 and the lower section 21 hold the sections 19 and 21 together. When these are removed, the top and bottom sections 19 and 21 may be separated for access to inside parts. Since the front door 13 is hinged at 15 to the lower wall 5 of the bottom section 21 and its latch 17 connects with the upper wall 7 of the upper section 19, the door must be opened before the sections may be separated for access to the interior. However, the door may be opened for partial access without separating the upper and lower sections 19 and 21.

At numerals 29 are shown four adjustable supporting rods for the corners of the housing 1. Each rod 29 passes with a close sliding fit through a suitable opening in the bottom 5 and extends up through a split clamp 31 attached to the lower section 21 by screws such as 33 (FIGS. 4 and 6). A draw screw 35 in each clamp 31 serves to clamp it to its respective rod 29, or to loosen it. Each draw screw 35 is operable from the exterior of the housing 1 by a rotary knob 37 pinned thereto.

The lower end of each supporting rod 29 carries a supporting roller 39 on a lower outwardly bent portion 41. Each bent portion 41 extends through its roller 39 for attachment by fastening means 30 to one of the two longitudinal side bars 43. Rotatably mounted on the ends of side bars 43 are swingable supports 45 which carry additional rollers 47. Clamp screws 49 serve to lock and unlock the swingable supports 45 with respect to the side bars 43. Each screw 49 has an operating knob 50 for turning it.

The purpose of the vertically adjustable rollers 39 and the transversely swingable rollers 47 is to provide gliding means for supporting the housing 1 on a pair of ordinary pipes such as are usually available at drilling sites. These may be of any suitable diameter. As illustrated in FIGS. 1, 2, 4 and 8, two such pipes 51 are held together by clamps 53 and a length of core material 55 supported or cradled therebetween. The gliding means, consisting of the rollers 39 and 47 and their adjustable connections with the housing (above described), is adjusted so that the housing 1 will straddle the core material 55 as the rollers 39 and 47 roll axially along the pipes 51. The purpose of the rollers 47, adjusted to engage the sides of the pipes 51, is to assure straight-line tracking of the rollers 39 along the tops of the pipes. Thus yawing of the rollers 39 and housing 1 is prevented. It will thus be seen that the housing 1 is movably supported on the pipes 51 acting as guides and that the housing straddles and is guided along the length of the core 55. It is to be remarked that seldom is core material such as 55 obtained in one piece from a core drill, that is, upon removal it becomes broken into segments such as indicated by the random lines 58 of FIGS. 1 and 8. After removal from a core drill such segments are laid on pipes 51 in a matched sequence according to their original sequential positions in the core drill so that they may be photographed in the sequence according to which they were related in the earth.

It will be understood that, instead of the pipes 51, other guides may be used, such as tracks. The device may even be used on a flat surface such as a bench top, floor or plank. In such event the guide rollers are raised and any suitable guiding means employed, including manual guidance.

At numeral 57 (FIGS. 1, 2 and 4) is shown a vertically adjustable light hood held in place by two sidewise clamp means detailed in FIG. 7. Each clamp means comprises a bracket 59 attached to the bottom 5. The sides 56 of the hood 57 slide inside of the brackets 59. These sides are slotted as shown at 60. Screws 62, extending from inner clamp plates 64, pass through slots in the sides 56 in the hood 57 and through holes in the brackets. Threaded on these screws 62 are exterior clamping knobs 66. By loosening the knobs the hood 57 may be adjusted up and down and then held in place by tightening knobs 66. The hood surrounds an opening 61 in the bottom of the housing 1. Its lower margins are shaped arcuately as at 63 which, when the gliding means and the hood are properly adjusted, will graze the top of the core material 55 as the housing 1 glides along the pipes 51. In the hood margins are transverse slots 65 for the reception of an indexed steel tape 67 as shown in FIGS. 2 and 4. The tape 67 and the top of the core material 55 are exposed to view from the inside of the housing 1 through the opening 61. The hood 57 locally shades the view of the core and tape from exterior light but complete light-tightness is not necessary. It will be understood that different light hoods having different lower margins may be substituted for the one described.

As shown in FIG. 8, the ends of the tape are fastenable by screw clamp means 69 attached to the abovementioned pipe clamps 53. When desired, the tape may be removed by loosening its ends from the clamp means 69. When fastened, the tape is manipulated to extend under tension as best shown in FIGS. 1 and 4. Thus it is made to extend through the slot 65 in the hood 57 and also through a guide member 71 at the rear end of the housing 1. Between the hood 57 and the guide member 71 the tape 67 is positioned to enter into and reemerge from the housing 1 through an opening 73. Adjacent to this opening 73 and inside of the housing 1 is a bracket 75. This is opposite another bracket 77 (FIG. 5). Pivotally mounted between these brackets 75 and 77 is a rocker plate 79 which carries a synchronous motor 81 and a cooling fan 83 therefor. Plate 79 also carries a gear-reduction unit 85 driven by the motor 81. The motor 81 is a drive motor for housing 1, as will appear. A spring 87, anchored at one end to the gear-reduction unit 85 and at the other end to the bottom 5, tends to swing the rocker plate 79 (along with the motor and gear-reduction unit mounted thereon) in a counter-clockwise direction (FIGS. 1 and 4).

The gear-reduction unit 85 has an output shaft 89 to which is pinned a sleeve 91 internally threaded at its outer end to receive and rigidly hold a fixed bolt 93. The sleeve 91 forms a journal on which is borne a rotatable sheave wheel 95 having an outer resilient surface 97. Threaded on the threaded bolt 93 is a clutch member 99 which may be hand-operated by turning it. When turned in one direction it threads to the left on the bolt 93. This causes its left-hand end 101 to clamp the wheel 95 against a shoulder 103 on the journal 91 so that the wheel becomes driven from the motor 81 through the gear-reduction unit 85. When turned in the reverse direction the clutch member 99 threads to the right on bolt 93. This releases the driving connection between the motor and the wheel 95. In short, this under normal loads is a manual clutching and declutching means for the sheave 95 on the driving journal 91. It may be remarked that the clutch member 99 is preferably knurled for obtaining a good manual grip, even with wet or oily fingers.

On FIGS. 1, 4 and 5 are shown pins 105 extending between the bracket 75 and front wall 27. These support idler wheels 107 which extend downwardly through the opening 73. As shown in FIGS. 1, 4 and 8, the tape 67 passes around the left-hand idler wheel 107, around the resiliently faced drive wheel 95, then around the right-hand idler wheel 107. The drive wheel 95 may be swung upward by rocking the plate 79 to accomplish insertion of the tape 67. When the plate 79 is released, the spring 87 swings the wheel 95 toward engagement with the tape extending around it and the idler wheels 107. This grips the tape around wheel 95. Consequently, when the wheel 95 is clutched on journal 91 and driven by the motor 81, it will act as a capstan progressing along the tape to drive the housing 1 continuously along the pipes 51. This causes the viewing opening 61 and hood 57 continuously and progressively to expose the length of the core material 55 to view from the inside of the housing. When it is desired to remove the housing 1 from the pipes 51, the tape 67 will be removed from the clamp 69 and from the wheels 95 and 107.

Referring to FIGS. 1, 3, 4 and 10, there is shown at numeral 109 a strip-film magazine which includes an exposed-film take-up reel 111 and an unexposed-film supply reel 113. The film, which may be of the conventional 35 mm. black and white or color variety, is indicated at 115. It passes over a roller 117 and then conventionally between a movable pressure plate 119 and a front plate 121 in which is a transverse light-transmitting slot 123. The parts here being described are better shown in detail in FIG. 10. The pressure plate 119 is biased by a spring 120. The front plate 121 is provided with flanges 125 slidable in guides 127 on the housing 1 for removably holding the magazine on the housing (FIG. 3). A lower stop 128 forms a rest for the magazine 109 and properly positions it on the back wall 9. The back wall 9 of the housing includes another slot 129 which registers with the slot 123 to transmit light to the film. To block this transmission when desired, there is provided a dark slide 131 insertable in space provided therefor in conventional manner in the front plate 121 ahead of its slot 123. Thus, when the dark slide is inserted as shown in FIG. 4, the film cannot be exposed. To expose it the dark slide is withdrawn.

The film take-up reel 111 is driven from a conventional constant-speed film drive unit 133 attached on one side of the magazine 109. This unit includes a synchronous motor 135 which, through a gear-reduction unit 137, continuously drives a film sprocket 139 and the film take-up reel 111. Motor 135 may be referred to as the film drive motor. The reel 111 receives its film from the driven sprocket wheel 139 which has the usual teeth (shown by dotted lines) for engaging the conventional holes in 35 mm. strip film. The drive is continuous so that the film is continuously moved behind the slots 123, 129 when the motor 135 is excited. Details of wiring will be discussed below. The wiring includes a flexible section 141, shown in FIG. 1, including a plug 143 for making a separable connection between the film drive motor 135 on the removable magazine and other parts of the wiring which are carried in the housing 1. These other wiring parts are not shown, except in the wiring diagram of FIG. 9. Thus, when the magazine 109 is to be removed from the housing 1 by sliding it from the guides 127, the plug 143 may be pulled out to allow this separation.

Mounted in connection with and forming part of the housing on the top wall 7 is a light-beam transmitting section 130 which at its front end has mounted a 45° reflecting mirror 147. The rear end of section 130 is formed by the upper part of the wall 9 containing said slot 129. In the section 130 is a lens holder 149 carrying a focusing lens 151. Behind the lens 151 is a removable slide 153 in which is a lens stop opening 155. The slide 153 may be removed and replaced by a similar slide having a stop opening of another diameter, as required. Above the slide 153 is a door 157 downwardly hinged at 159 on the bottom 145. A latch 161 connects the door with the top of the wall 9. The door also covers the slide 153 and certain switches to be described herein.

At numeral 163 is indicated a bank of ultraviolet tube lamps carried by the top wall 7 and extending transversely in the housing 1 (FIG. 4). At 165 is a bank of conventional white-light, tube lamps carried transversely by the door 13. Thus the lamps 163 and 165 generate different wave lengths. These wave lengths may be other than for white and ultraviolet light. Sockets for the lamps 163 and 165 are shown at numerals 167 and 169, respectively. Depending upon which bank of lights 163 or 165 is excited, the core material 55 and the tape 67 become exposed through the opening 61 and the hood 57 either to ultraviolet light or white light. The appropriately lighted core material and tape thus form a field of view, the light reflected therefrom passing upwardly to the 45° mirror 147 as shown by the dotted vertical ray 171. At the mirror 147 this light is reflected to the lens 151, as shown by the horizontal dotted ray 173. The lens in turn focuses the field of view on the film 115 through the slots 123 and 129, assuming the dark slide 131 to be withdrawn. The focusing ray from the lens 151 to the film 115 is numbered 175.

The distance from the optical center of the lens 151 to an arbitrary plane in the field of view of the core material 55 and tape 67 is equal to the sum of the rays 171 and 173. The depth of the field of view includes this arbitrary plane. This distance may be called A. The length of the ray 175 may be called B. The ratio of the gliding speed of the housing 1 along the core material 55 to the speed of movement of the film 115 past the slots 123 and 129 is equal to the ratio of A to B. Both of these movements of the housing and film are continuous, said ratios being determined by the speed of ratios of the gear driver 85 and 137, the driving motors 81 and 135 for these trains being of the synchronous type. Thus there will be progressively imprinted upon the film 115 behind slot 123 a continuous latent image of an entire length of progressively viewed core material and tape.

To avoid confusion in the drawings, wiring for the various electrical components has not been shown in FIGS. 1–8 but is sufficiently completely shown in FIG. 9. This includes an outside line plug connection at 177 for exciting main lead wires 179 in the housing 1. Connected across the lead wires 179 is a pilot light 181 for indicating when the leads 179 are excited. The white-light assembly 165 and the ultraviolet-light assembly 163 may be selectively connected across the lead wires 179 by switches 183 and 185, respectively. The drive motor 81 for housing 1 may be connected across the lead wires 179 by means of a switch 187.

Figure 10:
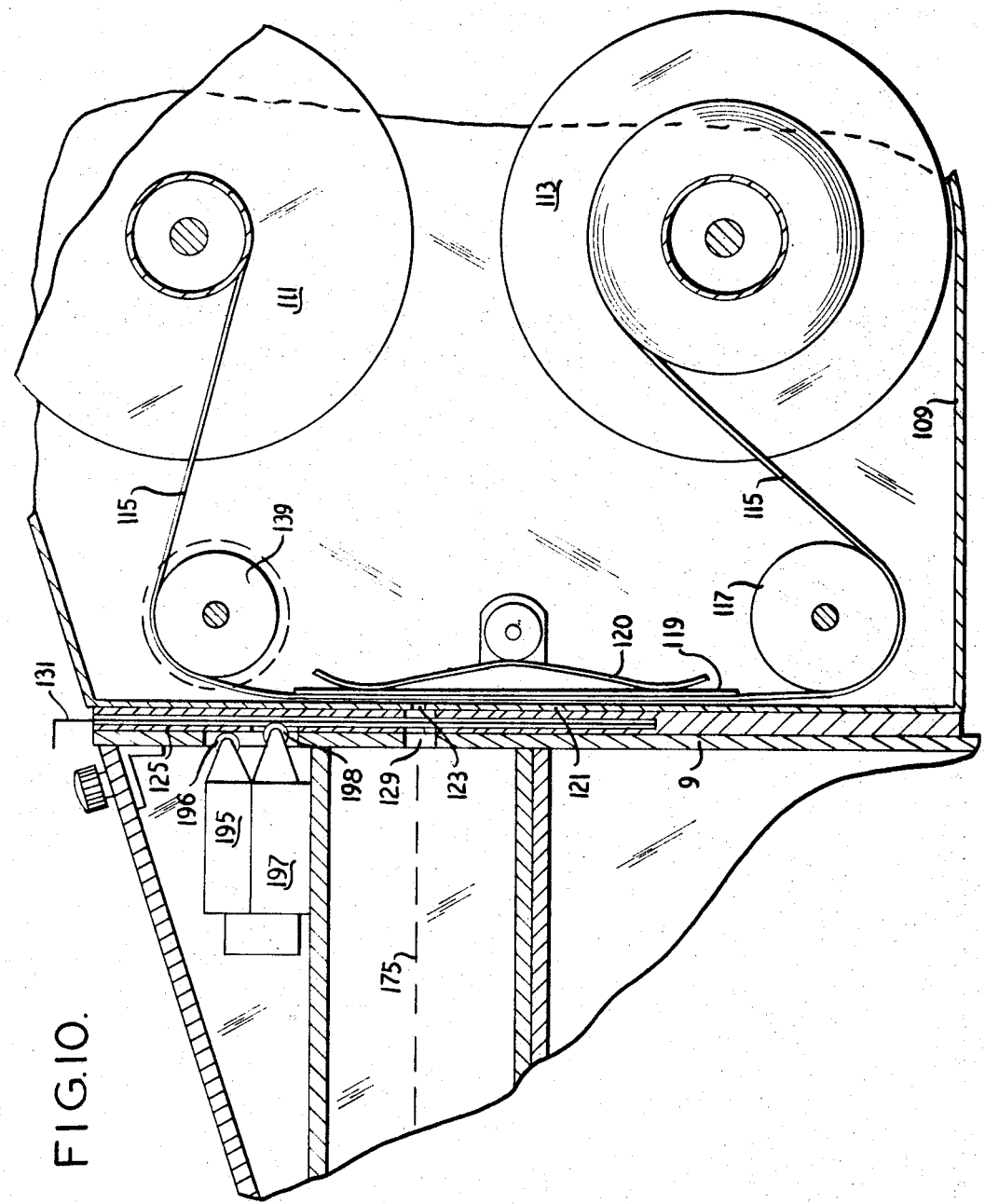
FIG. 10 is a much-enlarged sectional view of certain magazine parts of FIG. 4.

At numeral 189 is a switch whereby extension leads 191 from leads 179 may be excited or deexcited. Micro switches 195 and 197 are serially connected in one lead 191 ahead of four elements connected across the leads, namely, a signal lamp 193, the film drive motor 135, a synchronous motor 136 driving a film footage counter 199, and a synchronously driven time clock 201. The clock is desirable but not necessary. The switches 195 and 197 have operating detector arms terminated by rollers 196 and 198 (FIGS. 4 and 10). The roller 196 of the switch 195 engages the plate 125 of the magazine 109 to close the switch when the magazine is in position on the housing. When the magazine is removed this switch opens, making it impossible to drive the film drive motor 135, the counter 199, or the running time clock 201 (if used). This also extinguishes lamp 193.

The roller 198 of switch 197 engages the dark slide. When the dark slide is inserted, the switch is opened so that no film can be used when it is impossible to take pictures through the dark slide. When the dark slide is withdrawn, the switch 197 is closed.

General operation is as follows:

Core material 55 is laid out on the pipes 51. If fragmented, the fragments are matched in proper order. The rollers 47 and 50 are adjusted for proper gliding on pipes 51. The tape with its distance-indicating indicia on its upper side is threaded across the hood 57 through the hood slots 65, then around wheels 107 and sheave wheel 95 and through the guide 71, the ends being then attached to the clamps 69 as shown in FIG. 8. It may be desirable at this time to excite the housing drive motor 81 without having the film magazine 109 in position or, if in position, without exciting the film drive motor 135, the counter 199, or the running time clock 201. In the latter event switch 189 is left open, depriving these items of current. In the former event (magazine removed) the switch 195 will automatically deprive these elements of current. Then if the line 179 has been plugged in at 177 to the supply line, it is possible by closing the switch 187 to excite the drive motor 81 so as to make a dummy run of the housing 1 along pipes 51 to test the proper tracking motion of the housing 1 along the pipes 51. This will indicate any need for readjusting the positions of the rollers 39 and 47. During this test operation no film is exposed, whether or not the magazine is in position on the housing 1.

Next, assuming that the magazine 109 is in position on the housing, switch 195 will automatically close. It is assumed at this time that the dark slide 131 is inserted in the magazine 109. This holds up the switch 197 so that no current can pass to the line 191. Whenever the dark slide is drawn out the switch 197 will be closed. In this last state the apparatus is ready for taking a picture. Assume then that a reel of film has been inserted into the film magazine and that switches 183, 185, 187 and 189 are open. Then one of the switches 183 or 185 is closed, depending upon what type of light is required to be shown on the core material 55.

It is here to be noted that the film has both a forward and a rearward leader. Next the switch 189 is closed. This starts the synchronous film drive motor 135, the synchronous motor 136 in counter 199 and the synchronously-driven time clock if used, provided the magazine 109 is in place and its dark slide withdrawn, which closes both switches 195 and 197. The operator then awaits an arbitrary time as, for example, 10 seconds, during which the forward film leader is pulled past the slots 123 and 129. After this arbitrary time interval the switch 187 is closed, which excites the housing drive motor 81 which then operates in synchronism with the film drive motor 135, motor 136 of counter 199 and clock 201. The housing then moves continuously along the core material 55 as the film moves continuously at slower speed past the slots 123 and 129. The ratio of the film speed to the housing speed is the same as the ratio of the image size on the film to the size of the field of view through the opening 73. The operation is permitted to continue until the housing 1 reaches the end of the length of core material 55, at which time switch 187 is opened, thus stopping the motion of the housing. The switch 189 is left closed for an arbitrary time (10 seconds, for example), so as to run off the rear leader of the film so that it can be removed from the magazine 109. The switch 189 is then opened. It may be that the terminal run-off time occurs before the rear film leader is reached. In this event a blurred section will occur on the film indicating termination of one pictorial record thereon. Thus, for long lengths of film, several records may be made with blurred portions dividing the record portions. This is to indicate separation between the pictures for the successive picture-taking operations on one length of film.

It is intended that the apparatus made according to the invention will be rented or leased to users, who will pay for its use according to the amount of film used or the running time. This is the reason for making the drives for the counter 199 and the time clock 201 synchronous with the film drive motor. If used, the time clock will be mounted on the housing to display its hands. The counter is mounted as shown in FIGS. 1 and 4.

An advantageous feature of the horizontally disposed elongate form of the housing 1 is its compact form and stability on the pipes 51. The location of the viewing opening 61 at the front of the housing, the film magazine 109 at the back of the housing, the mirror 147 in front and over the opening 61, and the lens 151 between the mirror and the rear openings at 123 and 129, provide an arrangement which affords the compact convenient horizontal form of housing.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Photographic apparatus for continuously photographing elongate extents of material and indexed tape extending along support means; comprising a housing, gliding means supporting the housing on the supporting means for movement along the material and tape, said housing having a first viewing opening to provide a field of view of the material and the tape, said housing having a second opening, a film magazine supported on the housing and including a first synchronous motor drive for continuously moving a film strip past said second opening, means in the housing for lighting portions of the material and tape through said first opening, means including a lens in the housing to form a path for light reflected from said field of view through said openings and to said film strip, said lens focusing an image of the material and tape through the second opening and on said film strip, a second synchronous motor drive carried by the housing and engaging the tape to move the housing continuously on the support means and along the material and tape, said first and second motor drives being synchronized to effect a certain ratio of speed of the housing along the material with respect to the speed of the film strip past said second opening, said lens having an optical center located in said path to divide the path into a first length extending from a plane in the field of view of the material and tape to said optical center and a second length extending from said optical center to said film strip, said first and second lengths being in a ratio substantially equal to the ratio of said speed of the housing to said speed of the film strip.

2. Photographic apparatus according to claim 1, wherein the engagement between said second synchronous motor drive and the tape comprises a sheave wheel in the drive, idler wheels extending through an opening in the bottom of the housing for guiding the tape around said sheave wheel.

3. Photographic apparatus according to claim 2, including swingable means supporting said second synchronous motor drive and the sheave wheel, and resilient means biasing said swingable means toward said idler wheels to grip the tape, said swingable means being movable against bias for insertion or removal of the tape onto a removal from the sheave wheel.

4. Photographic apparatus according to claim 3, including manual means for clutching and declutching said sheave wheel relative to said second synchronous motor drive.

5. A core-logging camera for continuously photographing an extent of core material cradled between substantially parallel pipes which have spaced measuring tape-holding means affixed thereto; comprising a housing, gliding means supporting the housing on the pipes in straddling position over the cradled core material, said housing having a first viewing opening to provide a field of view of the core material and tape, said housing having a second opening, a film magazine supported on the housing, said magazine including a first synchronous motor drive for continuously moving film strip past said second opening, means in the housing for lighting portions of the cradled core material and the tape through said first opening, means including a mirror and lens in the housing to form an angled path for light reflected from said field of view through said first opening and to said film strip, said lens focusing an image of core material and tape through the second opening and on said film strip, a second synchronous motor drive carried by the housing and including means engaging the tape to move the housing continuously along the guides and core material, said first and second motor drives being synchronized to effect a certain ratio of speed of the housing along the core material with respect to the speed of the film strip past said second opening, said lens having an optical center located in said path to divide the path into a first angled length extending by reflection of the mirror from the field of view of the core material to said optical center and a second length extending from said optical center of the lens to said film strip, said first and second lengths being in a ratio substantially equal to the ratio of said speed of the housing to said speed of the film strip.

6. A core-logging camera according to claim 5, including a light hood extending from said first opening contoured substantially to the transverse upper shape of the core material, rollers supporting the housing for movement along the pipes, and means for verticaly adjusting said rollers for movements of said light hood closely along the core material.

7. A core-logging camera according to claim 6, including additional rollers transversely swingably supported with respect to the housing and engageable with the outsides of said pipes to prevent yawing action of the first-mentioned rollers on the pipes and of the housing.

8. A core-logging camera according to claim 1, including a light hood extending from said first opening contoured substantially to the transverse upper shape of the core material, and wherein said lighting means is constituted by selectively operated separate light sources of different wave lengths.

9. A core-logging camera for continuously photographing an extent of core material cradled between substantially parallel pipes which have spaced measuring tape-holding means affixed thereto; comprising tape, a horizontally elongate housing, adjustable rollers supporting said housing for guided movement along its length and along said pipes, said housing having a first viewing opneing at one end with an adjustable light shield therearound to provide a field of view of the core material and tape, said housing having at its other end a second opening and an attached film magazine adjacent the second opening, said magazine including a first synchronous motor drive for continuously moving strip film past said second opening, means in the housing for lighting portions of the cradled core material and the tape through said first opening, means including a mirror and lens in the housing to form an angled path for light reflected from said field of view up through said first opening and to said film strip, said lens focusing an image of core material and tape through the second opening and on said film strip, a second synchronous motor drive carried within the housing under said angled light path and including a sheave wheel in the drive, idler wheels extending through an opening in the bottom of the housing for guiding the tape around said sheave wheel, swingable means supporting said second synchronous drive and the sheave wheel, resilient means biasing said swingable means to bias the sheave wheel toward the idler wheels to grip the tape, manual means for clutching and declutching said sheave wheel relative to said second synchronous motor drive, said first and second synchronous motor drives effecting a ratio of speed of the housing along the core with respect to the speed of the film strip past said second opening, said lens having an optical center located in said path to divide the path into a first angled length extending by reflection of the mirror from the field of view of the core and tape to said optical center, and a second length extending from the optical center of the lens to said film strip, said first and second lengths being in a ratio substantially equal to the ratio of said speed of the housing to said speed of the film.

10. A core-logging camera according to claim 9, including selectively operable lighting means of different wave lengths within the housing for selectively lighting the core material through said first opening.

11. A core-logging camera according to claim 10, wherein said film magazine includes a dark slide to cover said second opening, first and second switch means engageable with the magazine and the dark slide respectively for preventing operation of the first synchronous motor drive for the film when the magazine is attached to the housing and the dark slide is in place therein or when the magazine is removed from the housing.

12. A core-logging camera comprising a housing, a removable film magazine for the housing, a dark slide for the magazine, a first synchronous motor drive for film in the magazine, a synchronous motor drive for moving the housing, a film-footage counter having a synchronous motor drive, a pair of switches serially connected with the first synchronous drive and with the synchronous drive for the counter for supplying current thereto only when the magazine is attached to the housing and said dark slide is removed therefrom.

13. A core-logging camera according to claim 12, including a first manually operable switch in series with said pair of switches for controlling said first synchronous motor drive and the synchronous drive for the counter, and a second manually operable switch for controlling said second synchronous motor drive for the housing.

14. A core-logging camera apparatus according to claim 13, including selectively operable lamps of different wave lengths within the housing and including manually operable switches for the respective lamps for selective excitation thereof.

References Cited

UNITED STATES PATENTS 3,373,440   3/1968   Jenkins et al. _____ 88—24

NORTON ANSHER, *Primary Examiner.*

R. L. MOSES, *Assistant Examiner.*

U.S. Cl. X.R.

346—107; 95—11